United States Patent [19]

Brantman et al.

[11] Patent Number: 5,695,242
[45] Date of Patent: Dec. 9, 1997

[54] SEAT CUSHION RESTRAINT SYSTEM

[75] Inventors: Russel Brantman, Tampa; Hendrik Bernardus Helleman, Brandon; Said Shafik Nakhla, Lakeland, all of Fla.

[73] Assignee: Breed Automotive Technology, Inc., Lakeland, Fla.

[21] Appl. No.: 601,933

[22] Filed: Feb. 15, 1996

[51] Int. Cl.$^6$ ............................................ B60N 2/42
[52] U.S. Cl. .................. 297/216.1; 280/730.1; 280/743.1; 280/753
[58] Field of Search ................. 297/216.1; 280/730.1, 280/743.1, 753

[56] References Cited

U.S. PATENT DOCUMENTS

| | | | |
|---|---|---|---|
| 2,735,476 | 2/1956 | Fieber | 297/193 |
| 2,834,606 | 5/1958 | Bertrand | 549/370 |
| 2,943,866 | 7/1960 | Witter | 280/748 |
| 3,452,834 | 7/1969 | Gaut | 180/271 |
| 3,591,232 | 7/1971 | Simon | 297/216.1 |
| 3,618,978 | 11/1971 | Klove et al. | 280/730.1 |
| 3,642,303 | 2/1972 | Irish et al. | 280/730.1 |
| 3,702,706 | 11/1972 | Sobkow | 280/730.1 |
| 3,981,520 | 9/1976 | Pulling | 280/730.2 |
| 3,998,291 | 12/1976 | Davis | 180/274 |
| 4,154,472 | 5/1979 | Bryll | 296/68.1 |
| 4,225,178 | 9/1980 | Takada | 297/216.1 |
| 4,948,168 | 8/1990 | Adomeit et al. | 280/732 |
| 5,125,472 | 6/1992 | Hara | 180/271 |
| 5,269,560 | 12/1993 | O'Laughlin et al. | 280/736 |
| 5,290,060 | 3/1994 | Smith | 280/736 |
| 5,306,883 | 4/1994 | Manandhar et al. | 200/61.53 |
| 5,312,131 | 5/1994 | Kitagawa et al. | 280/730.2 |
| 5,322,325 | 6/1994 | Breed et al. | 280/735 |
| 5,348,342 | 9/1994 | Haland et al. | 280/730.2 |
| 5,409,260 | 4/1995 | Reuber et al. | 280/753 |
| 5,425,551 | 6/1995 | Hawthorn | 280/743.1 |
| 5,433,476 | 7/1995 | Materna et al. | 280/736 |
| 5,458,366 | 10/1995 | Hock et al. | 280/729 |
| 5,556,160 | 9/1996 | Mikami | 297/216.1 |
| 5,558,399 | 9/1996 | Serber | 297/216.1 X |
| 5,567,006 | 10/1996 | McCarthy | 297/216.1 X |

FOREIGN PATENT DOCUMENTS

| | | | |
|---|---|---|---|
| 2237452 | 2/1975 | France | 297/216.1 |
| 0053525 | 3/1983 | Japan | 297/216.1 |
| 1275230 | 11/1989 | Japan | 297/216.1 |
| 92/06861 | 9/1992 | WIPO | |

*Primary Examiner*—Laurie K. Cranmer
*Attorney, Agent, or Firm*—Lonnie Drayer

[57] ABSTRACT

A seat structure has a device which acts to reduce the interaction between the lower extremities of a vehicle occupant and the vehicle interior. The seat structure also reduces the interaction between the vehicle occupant's legs and the instrument panel by limiting the forward travel of the lower torso. The seat structure may employ an airbag, a mechanical device or a pyrotechnic device, which elevates only the front part of the seat cushion to remove the leg and foot from the path of the intruding or reactive structure, and to minimize the travel of the lower torso into the instrument panel. A crash sensor activates the device when the crash sensor senses a crash of a selected severity.

17 Claims, 12 Drawing Sheets

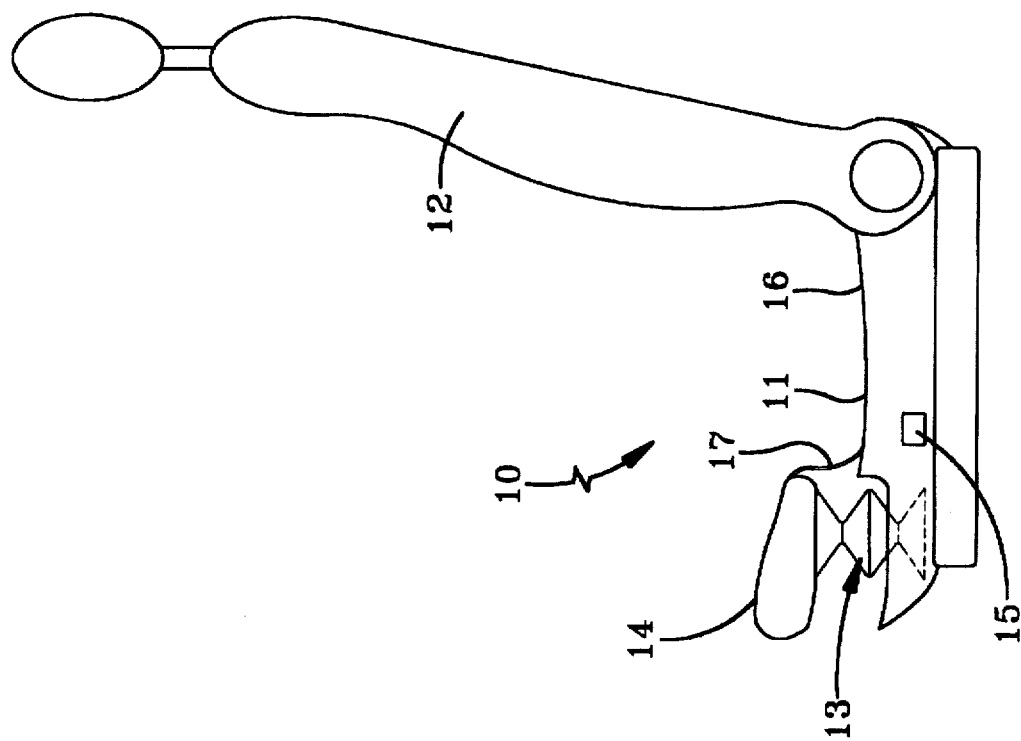
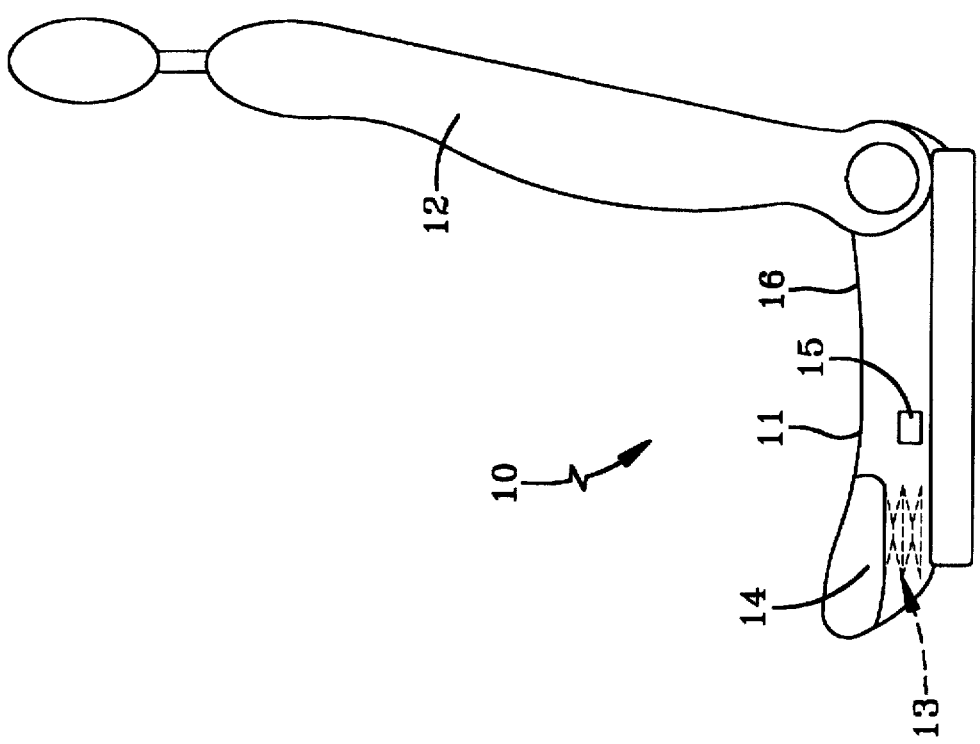

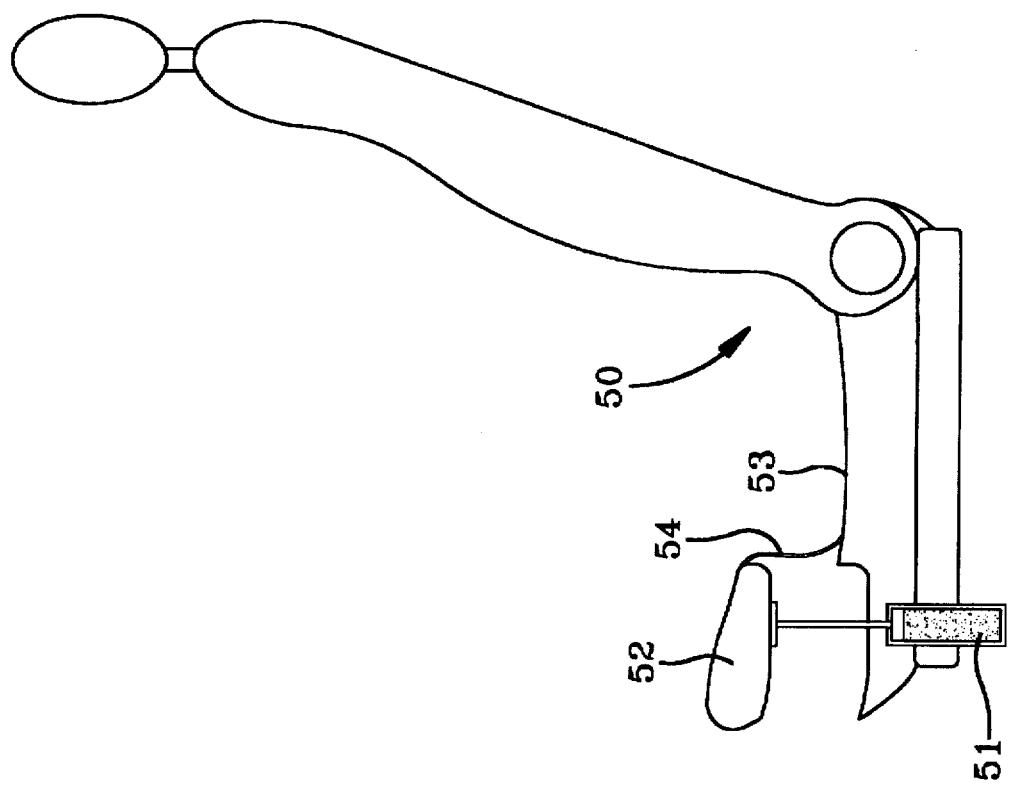
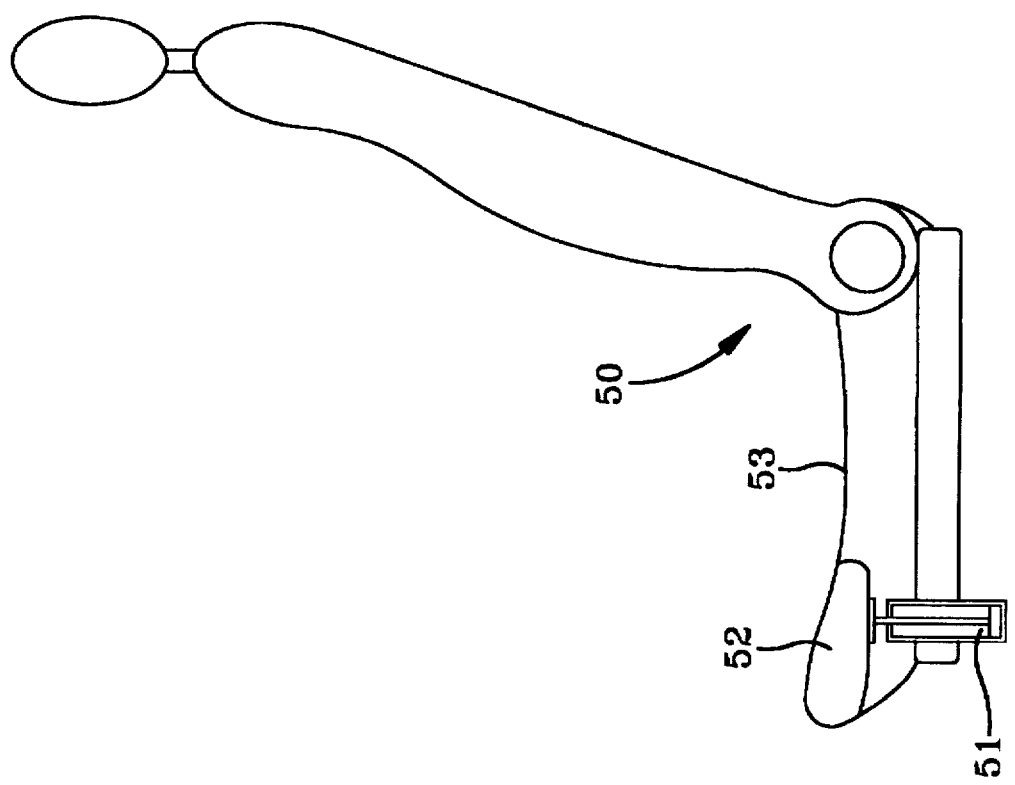

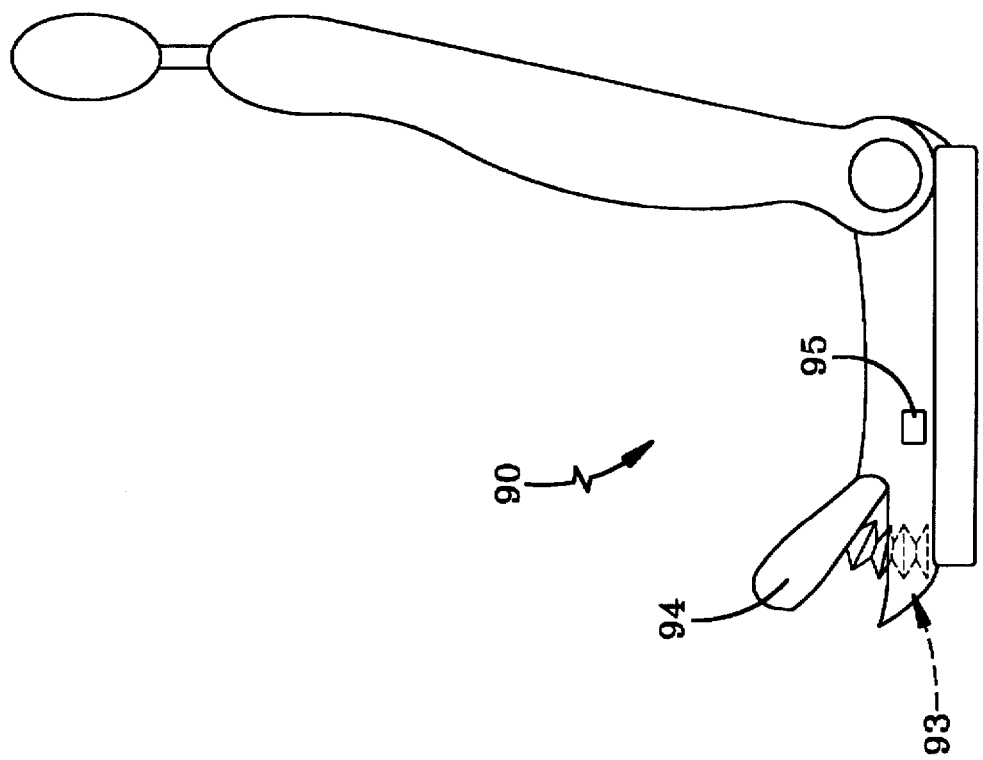
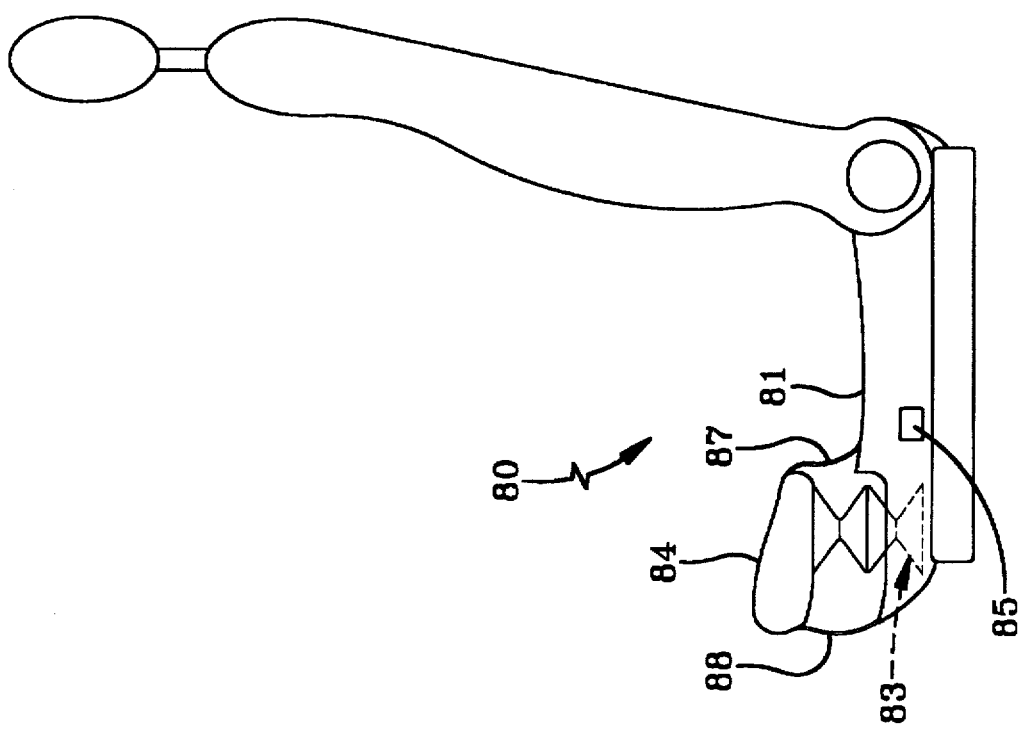

SEAT CUSHION RESTRAINT SYSTEM

The present invention relates to an apparatus which raises only the front part of a seat in the event that a vehicle is engaged in a collision.

BACKGROUND OF THE INVENTION

Although lower extremity injuries are generally not life threatening, they may be very debilitating and require long periods of rehabilitation. A possible cause of the ankle/foot injuries sustained in frontal crashes of vehicles is the foot dorsiflexion resulting from a vehicle occupant bracing against the toeboard. Furthermore, in the same type of crashes the driver may also experience an ankle injury caused by eversion or inversion of a foot as it slides off a pedal. In both cases, it is believed that a vehicle occupant bracing one or both legs in anticipation of a frontal crash is a major contributor to the injury mechanism. Another contributor to lower extremity injuries is interaction of a vehicle occupant's leg with the vehicle's instrument panel.

In a 1986 study (States, *Adult occupant injuries of the lower limb. Biomechanics and Medical Aspects of Lower Limb Injuries*, Society of Automotive Engineers, 97–107, Warrendale, Pa. 1986) lower limb injuries were ranked as the second most serious in vehicle crashes, after head injuries. Since then the widespread application of airbags has reduced the risk for head injury, making the injuries to the lower extremities even more commanding. Footwell intrusion, and contact with the control pedals have been identified as the principal causes of injuries to the ankle and foot (Pattimore et al., *The nature and cause of lower limb injuries in car crashes*, Proceedings of the Thirty-Fifth Stapp Car Crash Conference (SAE 912901), Society of Automotive Engineers, 177–188, Warrendale, Pa. 1991). Bracing of the leg against the floor and interaction with the instrument panel are key elements of lower limb fractures (Partyka, Comparison of Driver/Passenger and Right/Left Lower Leg Injuries in NASS Frontal Crashes, Proceedings of the International Conference on Pelvic and Lower Extremity Injuries, National Highway Traffic Safety Administration, Washington, D.C. 1995). Forces as low as 3 kN, applied to the base of the foot, have been reported to cause fracture of the heel bone (Nyquist, *Injury Tolerance Characteristics of Adult Human Lower Extremities Under Static and Dynamic Loading*, Society of Automotive Engineers; 79–90, Warrendale, Pa. 1986). Fracture causing injury mechanisms of the ankle, resulting from high rates of loading caused by an intruding toeboard, are inversion and eversion (Begeman et al., *Dynamic Human Ankle Response to Inversion and Eversion*, (SAE 933115), Society of Automotive Engineers, 83–93, Warrendale, Pa. 1993) as well as plantar flexion and dorsiflexion (Hirsch et al., *Experimental Ankle-Joint Fractures*, Acta Orthopedic Scandinavia, 36: 408–417, 1965; and Begeman et al., *Human Ankle Impact Response in Dorsiflexion*, (SAE 902308), Society of Automotive Engineers; 39–53, Warrendale, Pa. 1990). Axial force levels of 7 and 10 kN and bending moments of 200 and 360 Nm are known to cause fracture of tibia and femur bones respectively (Powell et al., *Cadaver Femur Responses to Longitudinal Impacts*, (SAE 751160), Society of Automotive Engineers, 561–579, Warrendale, Pa. 1975; and Yamada, *Strength of Biological Materials*, Krieger Publishing Company. Huntington, N.Y. 1973). Although these injuries typically have an Abbreviated Injury Scale (AIS) of less than 4, and are therefore not life threatening, they do require long periods of rehabilitation.

There is disclosed herein a seat structure device that acts to lift the lower limbs up from the floor to eliminate bracing and to minimize interaction with the intruding structure in a frontal collision. The disclosed seat structure device also reduces the interaction between the legs of a vehicle occupant and the vehicle interior, for example the instrument panel, by limiting the forward travel of the lower torso of the vehicle occupant. The seat structure device of the invention disclosed herein incorporates an airbag, pyrotechnic device, or mechanical device, which acts to raise the front part of the seat cushion in a frontal collision of sufficient severity to activate the device.

The seat cushion restraint system senses that the vehicle has been involved in a collision by using a device to sense sudden deceleration of the vehicle. In a preferred embodiment the seat cushion restraint system deploys an airbag to raise only the front part of the seat cushion. One means of rapidly inflating the airbag is by electrical or mechanical ignition of a pyrotechnic substance which rapidly generates a volume of gas sufficient to inflate the airbag. Alternatively, compressed gas stored in a chamber which is part of the airbag system may be rapidly introduced into the airbag to inflate it. Elevating only the front part of the seat cushion may also be achieved by mechanical means such as a spring loaded or pyrotechnic actuator located in the region of the front part of the seat cushion.

There is provided in accordance with one aspect of the present invention a seat cushion restraint system comprising a vehicle seat having a seat cushion and a backrest, a means of elevating only the front part of the seat cushion, and a means of sensing a crash of a vehicle, the means of sensing a crash communicating with the means of elevating only the front part of the seat cushion, and the means of elevating only the front part of the seat cushion being activated when the means of sensing a crash activates senses a crash of a selected severity.

There is provided in accordance with another aspect of the present invention a seat cushion restraint system comprising a vehicle seat having a seat cushion and a backrest, an airbag system comprising an inflator and an inflatable bag located in the region of the front part of the seat cushion, and a crash sensor, the crash sensor communicating with the inflator and activating the inflator when the crash sensor senses a crash of a selected severity, the activated inflator inflates the airbag thereby elevating only the front part of the seat cushion.

DISCUSSION OF THE PRIOR ART

There has been a considerable amount of effort made to develop various means of reducing the injuries that occur to the occupants of vehicles during crashes.

U.S. Pat. No. 2,735,478 relates to a car seat which alters the position of a vehicle occupant during a crash by pivoting the front of the car seat upward from a point at the rear of the car seat by a spring actuated means.

U.S. Pat. No. 2,834,606 relates to a safety device for vehicle occupants which uses form fitting airbags to restrain the leg movement of the vehicle occupants.

U.S. Pat. No. 2,943,866 discloses a device comprising support means disposed in front of a car seat including a spring-loaded positioning means for raising the knees of a vehicle occupant and an inertia-responsive releasing means to trigger the release of the spring-loaded positioning means in the event of an accident.

U.S. Pat. No. 3,452,834 relates to a device comprising a hydraulic jack for pivoting a car seat upwards from a pivot point at the rear of the car seat.

U.S. Pat. No. 3,591,232 discloses a car seat restraining member to restrain an occupant by abruptly raising the restraining member to contact the underside of a vehicle occupant's upper legs and fold the occupant's body between the restraining member and the back of the car seat.

U.S. Pat. No. 3,618,978 and U.S. Pat. No. 3,702,706 each teach the use of an airbag which is released from below the instrument panel and acts to restrain the vertically upward movement of the legs of a vehicle occupant. U.S. Pat. No. 3,642,303 teaches the use of multiple airbags which function to inhibit the vertical movement of the legs of a vehicle occupant.

U.S. Pat. No. 3,981,520 teaches a system which repositions a car seat into an occupant protecting position in the event of a collision by rotating the rear portion of the seat downwardly from a pivot point located at the front of the seat.

U.S. Pat. No. 3,998,291 discloses a car seat wherein the entire seat pivots upwardly and rearwardly about a pivot point located at the bottom rear of the seat such that the occupant is transported into a reclining position in the event of a collision.

U.S. Pat. No. 4,154,472 relates to a device to adjust the position of a vehicle occupant during a crash by a spring-loaded means that lowers the occupant's hips and raises the occupant's knees when the spring-loaded means is released by a solenoid.

U.S. Pat. No. 4,948,168 teaches a passive restraining device which moves a knee bolster horizontally from its normal position towards the lower legs and knees of a vehicle occupant in the event of a collision.

U.S. Pat. No. 5,125,472 discloses an apparatus for restraining the upper body of a vehicle occupant in a car seat during a collision including a spring actuated means which causes the car seat to descend in the event of a collision.

U.S. Pat. No. 5,312,131 teaches the use of multiple airbags which are released from a console disposed between a driver and passenger and inflate to occupy a space between the lower legs of the vehicle occupants and the knee bolster.

U.S. Pat. No. 5,348,342 teaches a retaining system for vehicle occupants wherein a swingable element mounted in front of the occupant swings towards the occupant's legs to restrain the legs from moving vertically upwardly or forward.

U.S. Pat. No. 5,458,366 teaches a compartmentalized airbag knee bolster which restrains movement of the knees of the front seat occupants.

BRIEF DESCRIPTION OF THE DRAWINGS

The features of the invention which are believed to be novel are set forth with particularity in the appended claims. The present invention, both as to its structure and manner of operation, may best be understood by referring to the following detailed description, taken in accordance with the accompanying drawings in which:

FIG. 1 is a diagrammatic side view of a first embodiment/ of a vehicle seat in accordance with the present invention in which the seat cushion restraint system employs an airbag device to elevate only the front part of the seat cushion, shown in a condition in which the seat cushion restraint system has not been activated;

FIG. 2 is a diagrammatic side view of the vehicle seat of FIG. 1 with the seat cushion restraint system activated;

FIG. 11 is a diagrammatic side view of a vehicle seat in accordance with a sixth embodiment of the invention in which the seat cushion restraint system employs a pyrotechnic device to elevate only the front part of the seat cushion;

FIG. 12 is a diagrammatic side view of the vehicle seat of FIG. 11 with the seat cushion restraint system activated;

FIG. 19 is a diagrammatic side view of a vehicle seat in accordance with a seventh embodiment of the invention in which the seat cushion restraint system employs an airbag integral with the seat cushion to elevate only the front part of the seat cushion; and FIG. 20 is a diagrammatic side view of a vehicle seat in accordance with an eighth embodiment of the invention in which the seat cushion restraint system employs an airbag to elevate only the front part of the seat cushion upwardly around a pivot point located at the rear edge of the front part of the seat cushion.

DETAILED DESCRIPTION OF THE INVENTION

Figure 3:
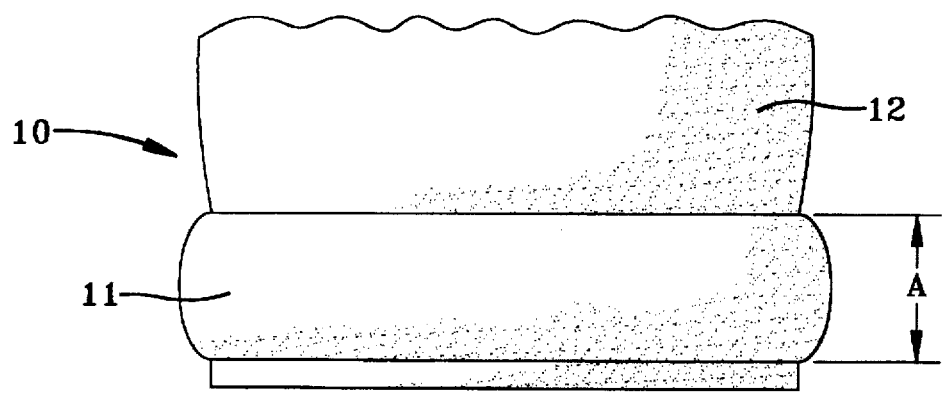
FIG. 3 is a diagrammatic fragmentary front view of the vehicle seat of FIG. 1 in which the seat cushion restraint system has not been activated.

Referring first to FIGS. 1 and 3 there is shown a diagrammatic side view and a diagrammatic fragmentary front view, respectively, of a vehicle seat 10 in accordance with a first embodiment of the present invention wherein the seat cushion restraint system has not been activated. As used herein and in the claims a vehicle seat comprises a seat cushion 11 which extends substantially horizontally to support the buttocks and upper legs of a vehicle occupant, and a backrest 12 which extends substantially vertically to support the upper body of a vehicle occupant. As used herein and in the claims with respect to a seat the terms "substantially horizontally" and "substantially vertically" are understood to mean that these directions can vary from horizontal and vertical planes in order to accommodate seating comfort and aesthetics. The seat cushion is normally provided with a strengthening inner frame (not shown) which is mounted on the floor of the vehicle. In the case of a front seat, the seat may be adjustable forwards and backwards, and even vertically. As used herein and in the claims, terms such as "forwards" and "backwards", "front" and "back", and "up" and "down" when used with regards to a seat, component of the seat cushion restraint system, or any other component of a vehicle, as well as a vehicle occupant are understood to refer to a frame of reference in a vehicle which is positioned upright on a level surface, with the vehicle component or system in its intended operating position, or the vehicle occupant seated and facing towards the front of the vehicle. An advantage of the seat cushion restraint system of the present invention is that it may be employed without significantly interfering with the normal range of adjustability of a vehicle seat.

Figure 4:
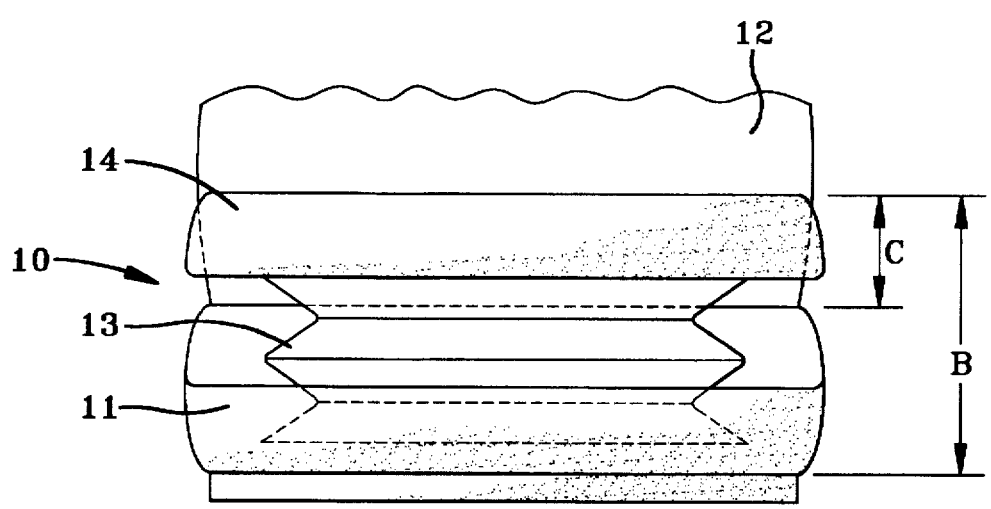
FIG. 4 is a diagrammatic fragmentary front view of the vehicle seat of FIG. 1 with the seat cushion restraint system activated.

In this first, and most preferred embodiment of the present invention, the seat cushion restraint system deploys an airbag device 13 to elevate only the front part 14 of the seat cushion, shown in FIGS. 1 and 3 in a condition in which the seat cushion restraint system has not been activated. As used herein and in the claims the term "elevate" in its various forms is understood to mean lifting, boosting, raising, or inflating or otherwise moving something to a higher position with respect to the floor of a vehicle. Referring next to FIGS. 2 and 4 there is shown a diagrammatic side view and a diagrammatic fragmentary front view, respectively, of the vehicle seat 10 of FIGS. 1 and 3 wherein the seat cushion restraint system 13 has been activated. The seat cushion restraint system disclosed herein comprises an apparatus incorporated into the structure of a vehicle seat that, as shown in FIG. 2 elevates only the front part 14 of the seat cushion 11 when a sensor (not shown) senses that a collision of selected severity has occurred. When a collision severe enough to activate the seat cushion restraint system occurs, the seat cushion restraint system lifts the lower legs of a vehicle occupant up from the floor to eliminate the possibility of bracing and to minimize interaction of the occupant's legs with the interior of the vehicle or an intruding structure. It is an important feature of the seat cushion restraint system that only the front part 14 of the seat cushion is elevated by the seat cushion restraint system while the remainder 16 of the seat cushion is not elevated because the seat cushion restraint system provides a restraint for the pelvis, eliminating the need for a full knee bolster. Computer simulations, which are described below in detail, have shown that the seat cushion restraint system of the present invention can dramatically reduce the axial loading in the tibias and femurs, and lumbar spine in a typical frontal crash situation, while retaining the same level of head and chest protection, when compared to a conventional vehicle occupant restraint system. As used herein and in the claims a "conventional vehicle occupant restraint system" is understood to refer to a system comprising any full or partial combination of a lap belt, shoulder harness, knee bolster, and an airbag mounted in the steering wheel or dashboard.

A seat cushion restraint system in accordance with the present invention comprises a means of sensing a crash of a selected severity and a means of elevating only the front part of the seat cushion a selected distance. In the most preferred embodiment the seat cushion restraint system comprises a crash sensor, a means for inflating an airbag, and an inflatable airbag disposed in the region of the front part of the seat cushion. As used herein and in the claims the "front part of the seat cushion" is understood to mean a portion of the seat cushion which extends (a) across substantially the entire width of the seat cushion, and (b) from the front edge of the seat cushion towards the seatback for a distance of not more than about one-half of the distance between the front edge of the seat cushion and the seatback. Although, for purpose of illustration only, the front part of the seat cushion is shown extending across the entire width of the seat cushion in the drawing figures, it is understood that the front part of the seat cushion may extend substantially across the entire width of the seat cushion while leaving lateral marginal portions of the seat cushion at either one or both edges thereof which are not elevated by the seat cushion restraint system so long as the seat cushion restraint system will still be capable of functioning to reduce occupant injuries in the manner described herein. For example in the test simulations which are described herein the seat cushion extends from the front edge of the seat cushion towards the seatback for a distance of about 150 mm. However, it is believed that the seat cushion restraint system of the present invention will function adequately if the front part of the seat cushion extends for a distance of about 100 to 200 mm from the front of the seat cushion towards the backrest. If a frontal collision is severe enough to induce injury to the lower extremities of a vehicle occupant, an airbag located in the region of the front part of the seat cushion is inflated to elevate only the front part of the seat cushion. The rising or inflating front part of the seat cushion will lift the vehicle occupant's feet away from the toeboard, thereby overcoming the occupant's natural reaction of bracing his, or her, feet against the toeboard or footboard of the vehicle, and minimizing leg interaction with any intruding or reactive structure. These two mechanisms will reduce or eliminate the potential for injury to the lower extremities and will also limit the forward motion of the pelvis during frontal crashes, thus acting as a substitute for a knee bolster.

Elevating only the front part of the seat cushion requires a force that can easily be provided by inflating an airbag or by other suitable mechanical or pyrotechnical means. The timing requirement is similar to a frontal airbag, but with a longer fill time, since the device only has to overcome the inertia forces caused by the weight of the lower limbs. Once the front part of the seat cushion is in an elevated position it can, if desired, be locked in place. The elevated front part of the seat cushion will react against the vehicle occupant's buttocks, allowing it to absorb the much higher forces exerted, by the pelvis under crash deceleration. The raised front part of the seat cushion acts, in conjunction with the unraised remainder of the seat cushion, as a lower torso restraint in a fashion similar to a lap belt. It prevents the knees from penetrating deeply into the instrument panel, and thereby dramatically reduces the femur loads and the potential for knee and leg injury.

The simulations which are disclosed herein indicated that if the seat cushion restraint system raises the front part of the seat cushion from an inactivated height, as shown at A in FIG. 3, to an activated height, as shown at B in FIG. 4, with the actual amount of the height raised, as shown at C in FIG. 4, being about 100 mm it is sufficient to lift the vehicle occupant's feet off the floor and keep them away from the toeboard during the entire deceleration phase of the vehicle. It is to be understood, of course, that this distance may vary from one vehicle to another, and even between different locations in a vehicle, such as passenger side and driver side, in the same vehicle. Although the elevation of the front part of the seat cushion needs to be performed in a timely fashion, the simulations indicate that reaching the full lift height within 45 milliseconds after frontal airbag trigger is sufficient to effectively restrain the lower torso. As used herein and in the claims the term "frontal airbag" is understood to refer to any airbag which is deployed from the steering wheel, dashboard, instrument panel, and so forth which inflates between an anterior surface of a vehicle occupant, who is facing the front of a vehicle, and the vehicle interior. As used herein and in the claims the term "frontal airbag trigger" is understood to refer to the initiation of the process of inflating a frontal airbag when a sensor senses a crash significant enough to require deployment of a frontal airbag.

In both the preferred and alternative embodiments described below the seat cushion restraint system employs at least one crash sensor (not shown) which may be a conventional sensor of any of the types which are well known in the crash sensing art, such as those taught in U.S. Pat. No. 5,322,325 and U.S. Pat. No. 5,306,883, which measure the rate of deceleration of the vehicle and produce an output signal or close and electrical circuit if the deceleration sensed indicates that a collision of a selected severity has occurred. The disclosures of U.S. Pat. No. 5,322,325 and U.S. Pat. No. 5,306,883 are incorporated herein by reference for the purpose of teaching crash sensors which may be employed in the practice of the present invention. The crash sensor(s) may be located in the front structure of the vehicle, in the steering wheel, in the dashboard, in the seat, or any other suitable location. The crash sensor(s) employed in the seat cushion restraint system may be dedicated only to the seat cushion restraint system or shared with other operating systems such as a belt pretensioning system or a system for deploying frontal airbags.

In the preferred embodiment of the present invention the crash sensor acts by closing an electrical circuit or initiating a firing signal that initiates a series of events which result in an airbag being inflated by a means for inflation 15, commonly referred to in the art as an inflator. In one preferred embodiment the crash sensor closes an electrical circuit or initiates a firing signal to the means for inflation 15 which activates a squib which ignites a pyrotechnic inflator employing sodium azide, or any other suitable gas generating compound, located in a housing. Cobustion of the gas generating compound produces a gas which flows through any necessary filters and into the airbag. U.S. Pat. No. 5,269,560 is incorporated herein by reference for the purpose of teaching a gas generating device as one means of inflation which may be adapted for use in the practice of the present invention. In another preferred embodiment the crash sensor closes an electrical circuit or initiates a signal to the means for inflation 15 to open a valve or activate any other suitable means which allows compressed gas stored in a chamber which is part of the seat cushion restraint system to be rapidly introduced into the airbag to inflate it. U.S. Pat. No. 5,433,476 is incorporated herein by reference for the purpose of teaching a stored gas inflator as one means of inflation which may be adapted for use in the practice of the present invention. In yet another embodiment a means for inflating 15 is a hybrid Of the gas generating and stored gas inflators. U.S. Pat. No. 5,290,060 is incorporated herein by reference for the purpose of teaching a hybrid stored gas/gas generating inflator as one means of inflation which may be adapted for use in the practice of the present invention. In any of these embodiments the volume of gas generated or released is sufficient to inflate the airbag and raise only the front part of the seat cushion in the manner described herein. The pressure required for an airbag to lift the front part of the seat cushion in the seat cushion restraint system will of course vary from application to application, but should typically be in the range of about 150 to 200 kPa with a required airbag volume of less than about 10 liters.

Put another way, a seat cushion restraint system in accordance with a preferred embodiment of the present invention comprises a vehicle seat 10 having a seat cushion 11 and a backrest 12. An airbag system comprising an inflator 15 and an inflatable bag 13 is located in the region of the front part 14 of the seat cushion. A crash sensor (not shown) communicates with the inflator and activates the inflator when the crash sensor senses a crash of a selected severity. The activated inflator inflates the airbag thereby elevating only the front part of the seat cushion. If desired a piece of fabric or plastic 17 may extend from the rear edge of the front part of the seat cushion 14 to the remainder 16 of the seat cushion.

Figure 5:
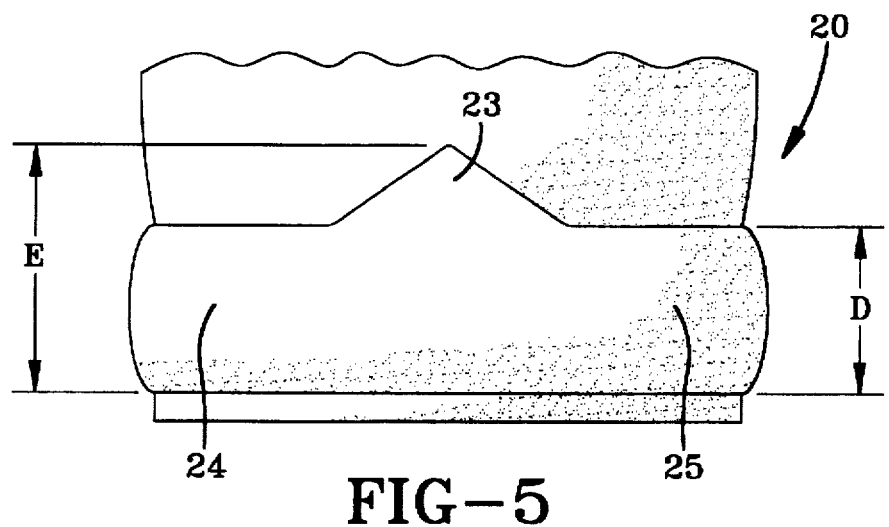
FIG. 5 is a diagrammatic fragmentary view of a vehicle seat in accordance with a second embodiment of the invention which relates specifically to the driver's seat and in which the seat cushion restraint system forces the driver's legs apart to decrease the interaction between the driver's legs and the steering wheel.
Figure 6:
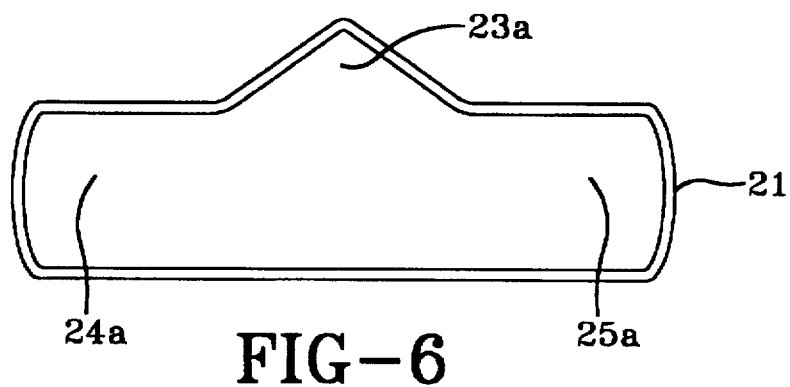
FIG. 6 is a diagrammatic front cross-sectional view of an airbag which may be employed with the embodiment to FIG. 5.

Referring next to FIG. 5 there is shown a diagrammatic fragmentary view of a vehicle seat 20 in accordance with a second embodiment of the invention which relates specifically to a driver's seat and in which the seat cushion restraint system forces the driver's legs apart as it raises them to minimize the interaction between the driver's legs and the steering wheel. FIG. 6 is a diagrammatic front cross-sectional view of an airbag 21 which may be employed with the embodiment of FIG. 5 and is embedded in or disposed below the seat cushion of a driver's seat. A central portion 23a of the airbag has a greater height than the lateral marginal portions 24a,25b of the airbag such that a portion 23 of the front part of the seat cushion is elevated to a height E which is greater than the height D to which the lateral marginal portions 24,25 of the front part of the seat cushion are elevated. The central portion 23a of the airbag is aligned with the steering wheel. The lateral sides of the central portion 23 of the front part of the seat cushion are sloped outwardly to force the legs of the occupant of the driver's seat apart sufficiently to reduce, or eliminate, the contact of his legs with the steering wheel.

Figure 7:
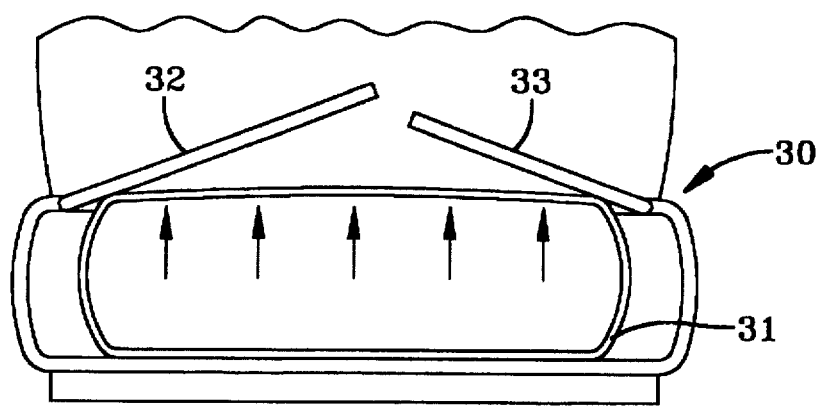
FIG. 7 is a diagrammatic front cross-sectional view of a third embodiment of the invention which relates to the driver's seat and in which the seat cushion restraint system forces the driver's legs apart to decrease the interaction between the driver's legs and the steering wheel.

Referring next to FIG. 7 there is shown a diagrammatic front cross-sectional view of a third embodiment of the invention which relates to a driver's seat 30. When the airbag 31 is inflated it exerts a force in the direction indicated by the arrows causing hinged portions 32,33 of the front part of the seat cushion to swing upwardly and outwardly about pivot points located near the lateral edges of the seat cushion which forces the driver's legs apart as it raises them to minimize the interaction between the driver's legs and the steering wheel. The hinged portions 32,33 are normally adjacent to one another along a line which is aligned with the steering wheel when the seat cushion restraint system is not activated.

Figure 8:
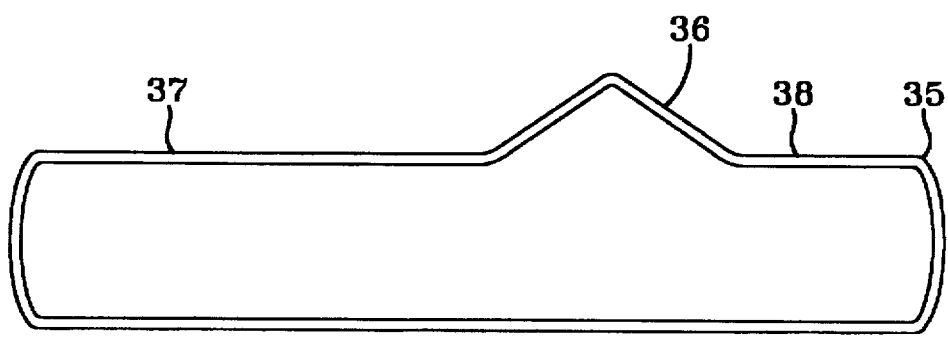
FIG. 8 is a diagrammatic cross-sectional view of an airbag, in an inflated condition, which may be employed in a fourth embodiment of the invention relating to a front bench seat for a vehicle.

Referring next to FIG. 8 there is shown a diagrammatic cross-sectional view of an airbag 38, in an inflated condition, which may be employed in a fourth embodiment of the invention relating to a front bench seat for a vehicle. This embodiment functions similar to that described in regards to FIGS. 5 and 6 except that the portion 36 of the airbag, and thus of the seat cushion, which is elevated to a greater extent than the lateral marginal portions 37,38 is offset to one side of the longitudinal axis of the vehicle sufficiently to be aligned with the steering wheel such that the lateral sides of the most elevated portion of the front part of the seat cushion are sloped outwardly to force the legs of the occupant of the driver's seat apart sufficiently to reduce, or eliminate, the contact of his legs with the steering wheel. Put another way, in an embodiment of the present invention wherein the seat is a front bench seat for a motor vehicle, the airbag has a first portion bordered by a pair of lateral marginal portions, the first portion of the airbag being closer to one side of the end of the seat than the other and having a greater height than the lateral marginal portions of the airbag such that a first portion 23 of the front part of the seat cushion is elevated to a height which is greater than the height of the rest 24,25 of the front part of the seat cushion.

Figure 10:
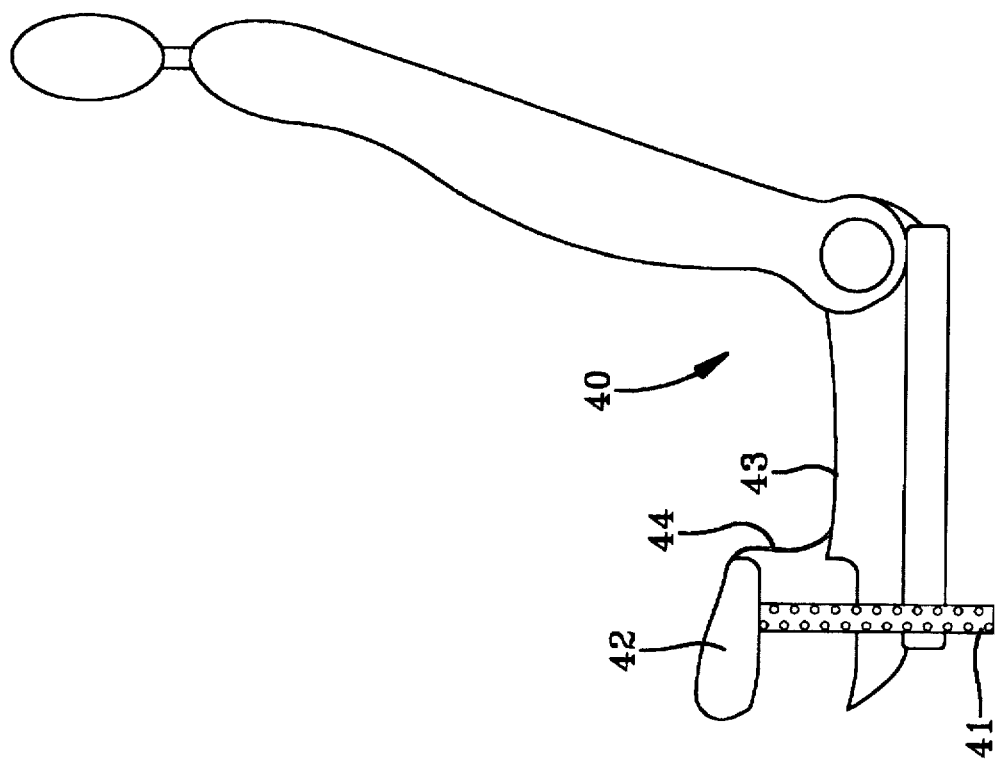
FIG. 10 is a diagrammatic side view of the vehicle seat of FIG. 9 with the seat cushion restraint system activated.
Figure 9:
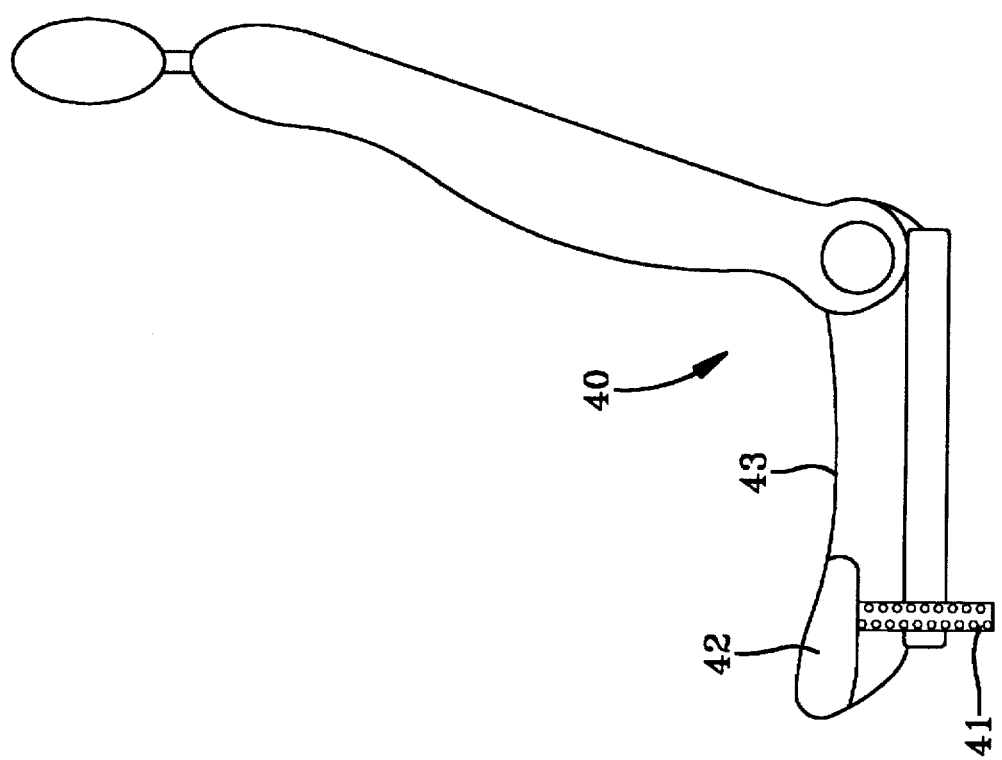
FIG. 9 is a diagrammatic side view of a vehicle seat in accordance with a fifth embodiment of the invention in which the seat cushion restraint system employs a spry-loaded device to elevate only the front part of the seat cushion.

Referring next to FIG. 9 there is shown a diagrammatic side view of a vehicle seat 40 in accordance with a fifth embodiment of the invention in which the seat cushion restraint system employs a spring loaded device 41 to elevate only the front part 42 of the seat cushion 43, and FIG. 10 is a diagrammatic side view of the vehicle seat of 40 FIG. 9 with the seat cushion restraint system activated. In this alternative embodiment the means 41 of elevating only the front part of the seat cushion a selected distance is a spring loaded device in which the spring is normally in a compressed state as shown in FIG. 9, and is released to an expanded state when the compression of the spring is released as shown in FIG. 10. The compression on the spring is released in response to a signal from a crash sensor (not shown) when the crash sensor detects a crash of a selected severity. The spring may be a coil spring, as shown in FIG. 10, but could also be a leaf spring, or any other suitable form of stored energy which when compression thereon is released will exert a force upwardly to raise only the front part of the seat cushion a selected distance in accordance with the above stated mode of operation of a seat cusion restraint system. The compressive force on the spring, or other suitable form of stored energy may be released by mechanical, electrical, electro-mechanical, magnetic, pneumatic, hydraulic or any other suitable means. If desired a piece of fabric or plastic 44 may extend from the rear edge of the front part of the seat cushion 42 to the remainder of the seat cushion.

Referring next to FIG. 11 there is shown a diagrammatic side view of a vehicle seat 50 in accordance with a sixth embodiment of the invention in which the seat cushion restraint system employs a pyrotechnic device 51 to elevate only the front part 52 of the seat cushion 53, and FIG. 12 is a diagrammatic side view of the vehicle seat of FIG. 11 with the seat cushion restraint system activated. In this alternative embodiment the means 51 of elevating only the front part of the seat cushion a selected distance is a pyrotechnic device in which a pyrotechnic compound is stored in a telescoping sleeve or in a cylinder having a piston slidably disposed therein. For example, a piston type of device 51 is shown in FIG. 11. When the pyrotechnic compound is ignited by an igniter, the force of the resulting explosion and any generated gas causes the piston to move upwardly thereby exerting a force upwardly to raise only the front part of the seat cushion a selected distance in accordance with the above stated mode of operation of a seat cusion restraint system. The igniter is activated by a signal or electrical impulse from a crash sensor (not shown) when the crash sensor detects a crash of a selected severity. The means of elevating only the front part of the seat cushion is preferably designed such when the piston, or telescoping sleeve extends upwardly as a result of the explosion, the piston or telescopic sleeve will remain locked in position with the front part of the seat cushion in its elevated position. If desired a piece of fabric or plastic 54 may extend from the rear edge of the front part of the seat cushion 52 to the remainder of the seat cushion.

Referring next to FIG. 19 there is shown a diagrammatic side view of a vehicle seat 80 in accordance with a seventh embodiment of the invention which is very similar to the first embodiment shown in FIGS. 1 and 2. However, in this seventh embodiment the seat cushion restraint system employs an airbag 83 which is integral with the front part 84 of the seat cushion to elevate only the front part of the seat cushion when the airbag is inflated by a means for inflation 85. Pieces of fabric or plastic 83,87 extend from the front and rear edges, respectively, of the front part of the seat cushion 84 to the front of the seat cushion and the remainder of the seat cushion, respectively.

Referring next to FIG. 20 there is shown a diagrammatic side view of a vehicle seat 90 in accordance with an eighth embodiment of the invention in which the seat cushion restraint system employs an airbag 93 to elevate only the front part of the seat cushion upwardly around a pivot point located at the rear edge of the front part of the seat cushion when the airbag is inflated by a means for inflation 95.

A study was conducted which focused on determining the base operating parameters for a seat cushion restraint system operated through inflation of an airbag system. A model representing the passenger side of a compact sedan was made for the MADYMO Crash Victim Simulation Code. MADYMO is a computer program which is available from TNO Road Vehicles Research Institute, Schoemakerstraat 97, Delft, The Netherlands. The simulation was configured for a typical Federal Motor Vehicle Safety Standard (FMVSS) 208 crash test, i.e. a frontal barrier impact with a velocity of 30 mph and a fiftieth percentile Hybrid III dummy with the seat in mid position. Both unbelted and belted configurations were investigated. The study concentrated on the passenger side of a vehicle only. However, it is believed that similar results could be obtained by studying the driver's side of a vehicle.

The baseline model, used for comparison with the seat cushion restraint system, has a 150 liter airbag deployed from the dashboard and a knee bolster as passive restraints. Also considered is a configuration with an added three-point belt and pretensioner that is designed for use with a full size airbag. The restraints are optimized to a degree that all injury measures fall well within the FMVSS 208 limits.

The dummy model used for this study is equipped with bracket joints in the femurs and tibias simulating load transducers. These allow registration of the axial forces and lateral bending moments, both of which play a role in injury causing mechanisms. Other features of the dummy model, which are of significance to this study, are a deformable abdomen and a compressible lumbar spine. The deformable abdomen is important for accurate modeling of the lap belt interaction. The compressible lumbar spine allows better assessment of loads and deformations directed through the lumbar spine.

The primary restraint, the airbag deployed from the dashboard, was modeled with approximately 3000 elements using the MADYMO Finite Element capability (Lupker et al., *The MADYMO Finite Element Airbag Model*, Proceedings of the Thirteenth International Technical Conference on Experimental Safety Vehicles, (91-S9-O-23), Paris, France, 1991). The bag is folded to fit inside a module mounted on the front of the dashboard. The configuration with belts uses a combination of finite element and spring-damper techniques to model the three-point belt restraint system. This technique allows realistic movement of the lap belt over the lower torso (Fraterman et al., *Evaluation of Belt Modeling Techniques*, (SAE 930635), Frontal Impact Protection: Seat Belts and Air Bags (SP-947), Society of Automotive Engineers, Warrendale, Pa. 1993). This is of special benefit here, in a situation where the belt motion is not known from tests.

For the study into the effectiveness of the seat cushion restraint system, the seat model is extended with a simplified representation of this system. The seat cushion is split into two parts. The rear part of the seat cushion is 250 mm long and extends from the rear of the seat cushion. The front part of the seat cushion is 150 mm long and extends from the front of the seat cushion. The front part of the seat cushion is positioned underneath the vehicle occupant's femurs. The model allows lifting of only the front part and he seat cushion with rise height and timing as variables. The stiffness of the rear edge of the front part of the seat cushion was modified to reflect its use as a restraining device, but this does not influence the comfort characteristics of the cushion since the modification involves mainly the normally unexposed rear edge of the front part of the seat cushion.

In simulations with a seat cushion restraint system of the present invention, the stiffness of the knee bolster was reduced to the level of a typical trim panel because its function as a restraint for the lower torso is taken over by the seat cushion restraint system. Furthermore, the venting characteristic of the dashboard mounted airbag restraint system was slightly modified to reflect the increased penetration of the femurs into the airbag. No changes were made to the belt system.

Two additional simulation models were used in the evaluation of the seat cushion restraint system. Both used the vehicle environment described above. However, in one model the initial position of the occupant was changed from a relaxed sitting position into a braced position. Joint locking and unlocking mechanisms were used to simulate yielding at higher force levels. In the second model, the fiftieth percentile occupant is replaced by a dummy model of a three year old child. The child dummy is placed on the tip of the seat, directly in-line with the seat cushion restraint system.

A parameter study was conducted to assess the feasibility of the seat cushion restraint system and find its most optimum configuration. Front seat cushion rise height was varied between 50 to 150 millimeters (mm), and time to maximum height was varied from 15 to 45 milliseconds (ms). The seat cushion restraint system was triggered at the same time as the dashboard mounted airbag, which was 15 ms after a sensor sensed that a severe collision had occurred.

Figure 13:
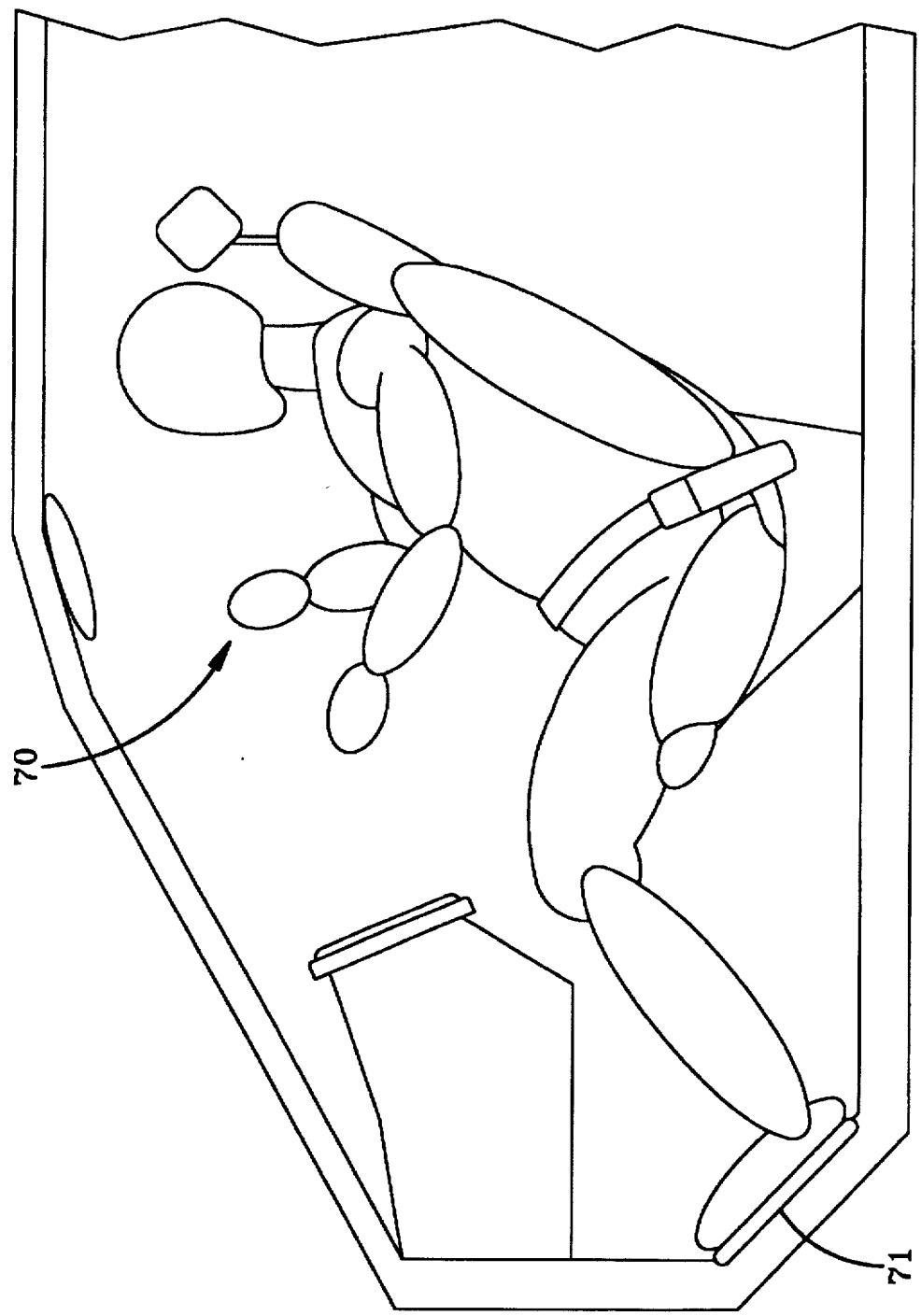
FIG. 13 is a diagrammatic representation of a vehicle occupant bracing himself for an impending collision.

FIG. 13 is a diagrammatic representation of a vehicle occupant 70 instinctively pushing forward with his feet against the toeboard 71 to restrain forward motion of his body. This protective bracing reaction may vary greatly from person to person, and may be greatly reduced if the collision is too sudden so that the vehicle occupant has no time to react. However, in any head-on collision it is desirable to minimize the likelihood of injury to the legs of the vehicle occupant due to contact with the toe board, knee bolster, dashboard and/or steering wheel.

Figure 14B:
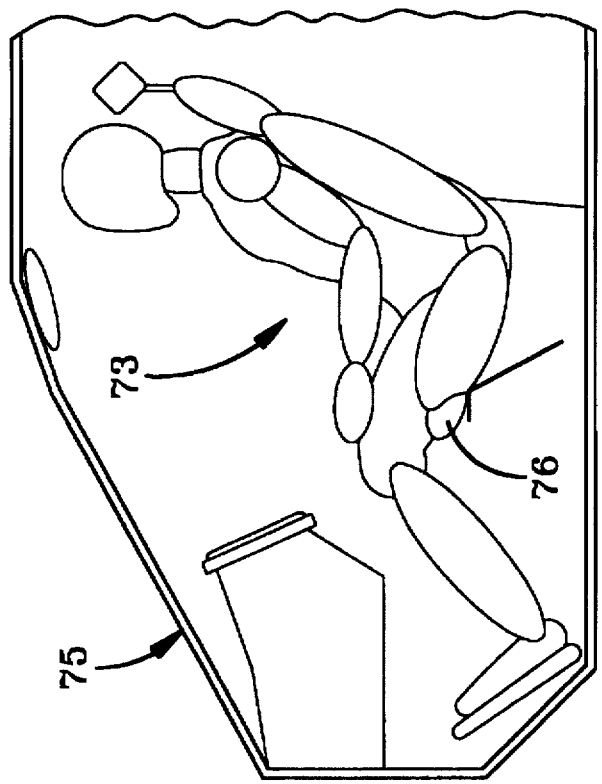
FIGS. 14A and 14B are diagrammatic representations, based upon a computer simulation using MADYMO, of vehicle occupants at the moment when a vehicle impacts another object head-on severely enough to actuate the seat cushion restraint system, in a baseline vehicle and a vehicle equipped with a seat cushion restraint system of the present invention, respectively.
Figure 14A:
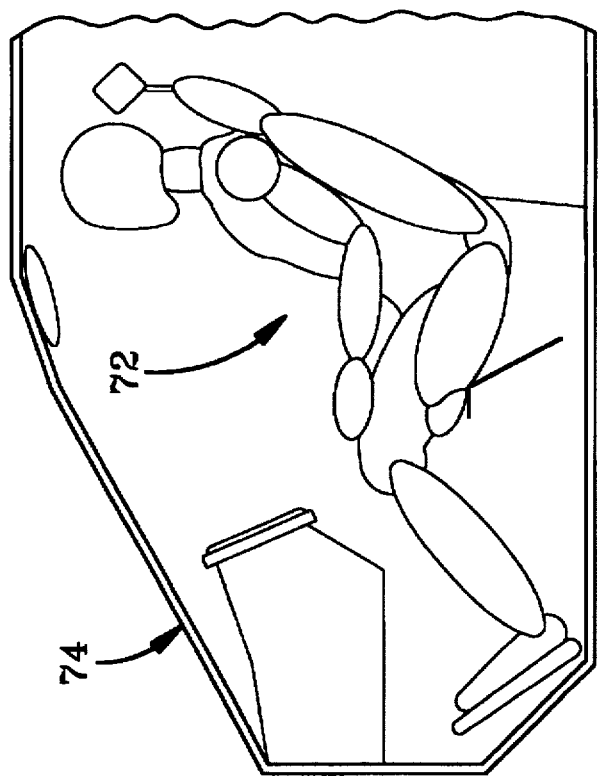
Figure 15B:
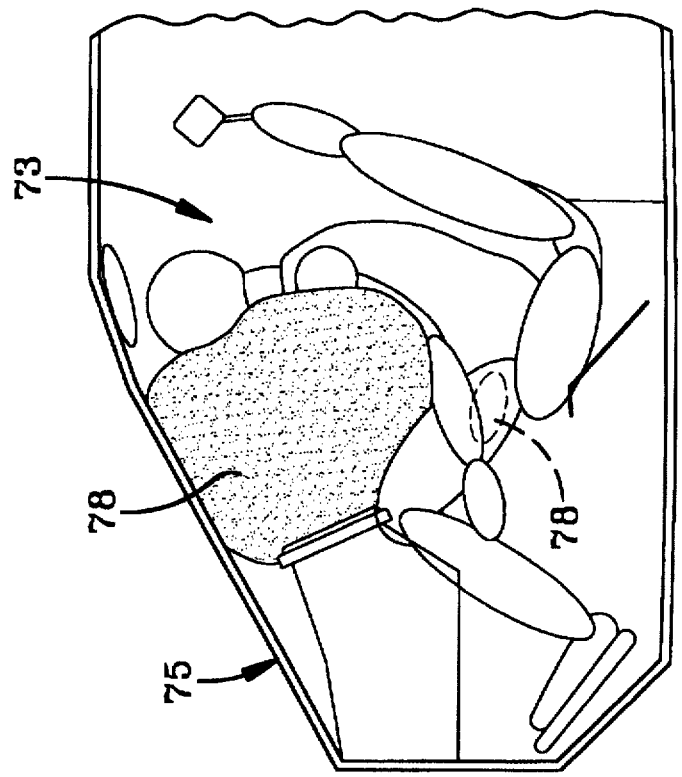
FIGS. 15A and 15B are diagrammatic representations, based upon a computer simulation using MADYMO, of vehicle occupants at 60 milliseconds after a vehicle impacts another object head-on severely enough to actuate the seat cushion restraint system, in a baseline vehicle and a vehicle equipped with a seat cushion restraint system of the present invention, respectively.
Figure 15A:
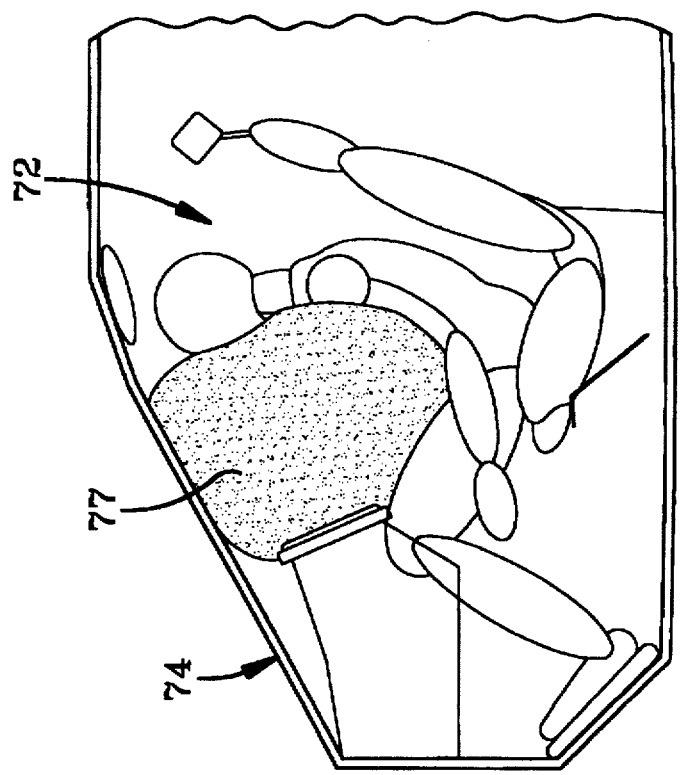
Figure 16B:
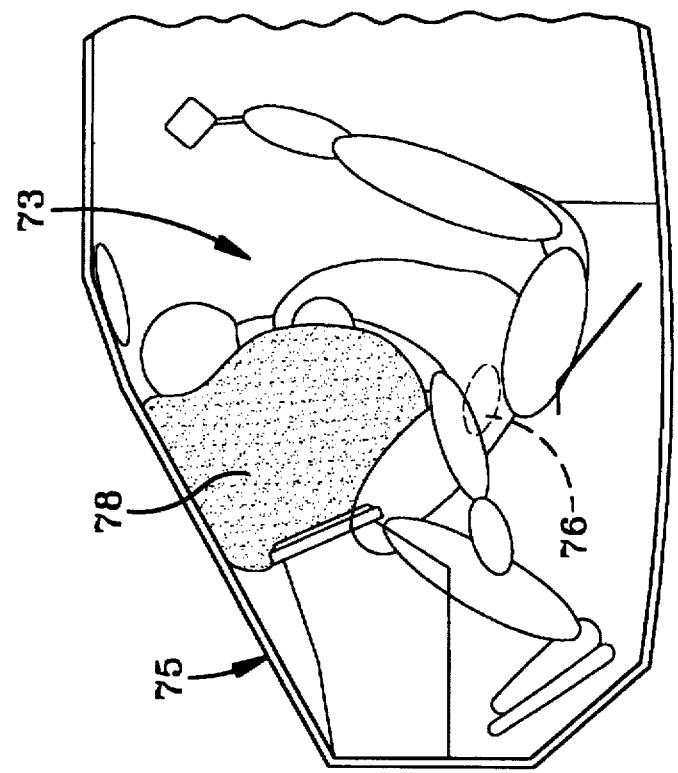
FIGS. 16A and 16B are diagrammatic representations, based upon a computer simulation using MADYMO, of vehicle occupants at 80 milliseconds after a vehicle impacts another object head-on severely enough to actuate the seat cushion restraint system, in a baseline vehicle and a vehicle equipped with a seat cushion restraint system of the present invention, respectively.
Figure 16A:
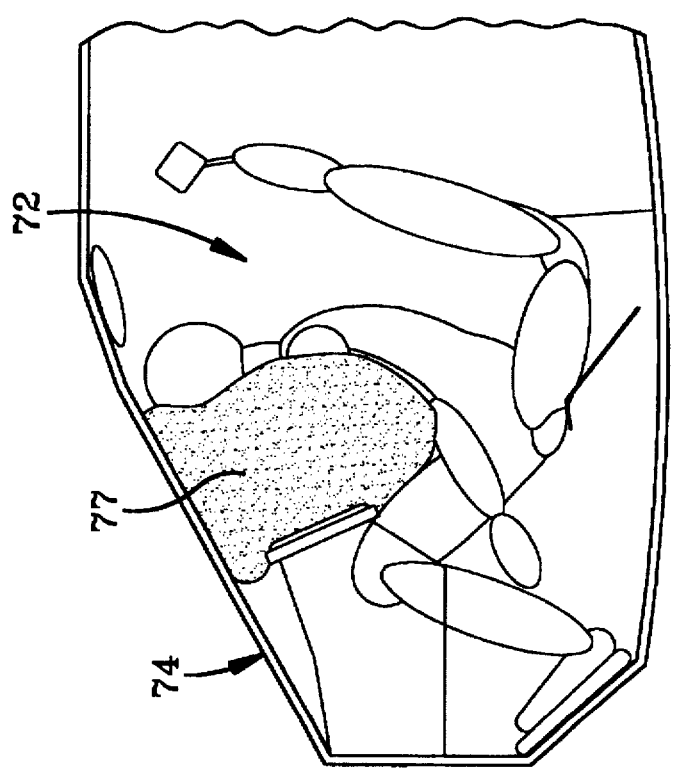

FIGS. 14A and B, 15A and B, and 16A and B are diagrammatic representations of the MADYMO simulation showing a comparison of the kinematics of an unbelted occupant 72 in the baseline vehicle 74 model versus an unbelted occupant 73 in a vehicle 75 equipped with the seat cushion restraint system. FIGS. 14A and 14B show vehicle occupants 72,73 at the moment when a vehicle contacts another object head-on in a baseline vehicle 74 and a vehicle 75 equipped with a seat cushion restraint system 76 of the present invention, respectively. FIGS. 15A and 15B show vehicle occupants 72,73 at 60 ms after a vehicle contacts another object head-on in a baseline vehicle 74 and a vehicle 75 equipped with a seat cushion restraint system 76 of the present invention, respectively. FIGS. 16A and 16B show vehicle occupants 72,73 at 80 ms after a vehicle contacts another object head-on in a baseline vehicle 74 and a vehicle 75 equipped with a seat cushion restraint system 76 of the present invention, respectively. These simulations show that the seat cushion restraint system succeeds in lifting the vehicle occupant's feet off the toeboard in a timely fashion. This prevents bracing of the vehicle occupant's legs that can cause high axial forces resulting in foot and ankle fractures. An apparatus according to the present invention prevents the vehicle occupant's feet from impacting the toeboard during the entire deceleration phase of the vehicle in the event of a collision.

The elevated front part of the seat cushion provides a reaction surface for the pelvis of the vehicle occupant and acts as a lower torso restraint in a fashion similar to a lap belt. It prevents the knees from penetrating deeply into the instrument panel, and thereby dramatically reduces the femur loads and potential for knee and leg injury.

The injury measures resulting from the baseline model all fell within the FMVSS 208 limits. However, with an axial force of 8,000 Newtons (8 kN) for the femurs and 5 kN for the tibias, the forces are in a range where lower limb fractures have been observed. The model does not indicate what kind of injuries might occur, but field data show that foot, ankle, and knee fractures are most common at these force levels.

Figure 17:
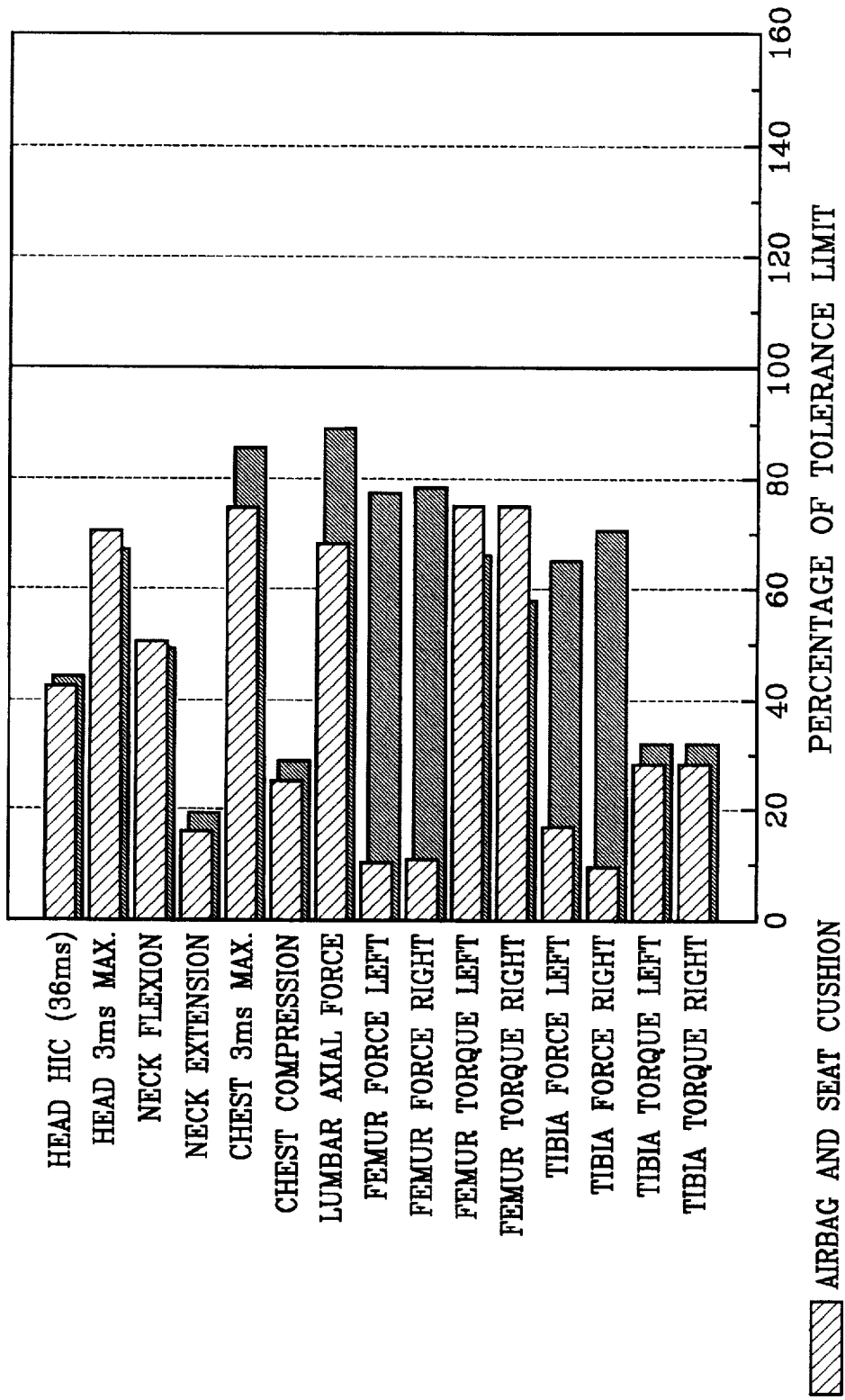
FIG. 17 is a chart showing injury measures, based upon a computer simulation using MADYMO, for a vehicle occupant restrained by only an airbag and knee bolster versus a vehicle occupant restrained only by an airbag and a seat-cushion restraint system.

FIG. 17 is a graphic comparison of the injury measures of the baseline model and the model with the seat cushion restraint system, both without a seat belt being worn by the vehicle occupant. FIG. 17 shows the dramatic decrease of the axial forces in both femurs and tibias, while other injury measures remain at comparative levels. Table 1 presents a comparison of injury measures of the lower limbs for the baseline and seat cushion restraint system (SCRS) equipped models.

TABLE 1

|  | UNBELTED OCCUPANT | | | BELTED |
| --- | --- | --- | --- | --- |
| OCCUPANT INJURY MEASURE | AIRBAG AND BOLSTER | AIRBAG AND SCRS | AIRBAG AND BOLSTER | AIRBAG AND SCRS |
| femur force, left leg | 7.7 kN | 1.3 kN | 1.5 kN | 0.4 kN |
| femur force, right leg | 7.8 kN | 1.3 kN | 1.4 kN | 0.5 kN |
| tibia force, left leg | 4.6 kN | 0.4 kN | 4.6 kN | 0.3 kN |
| tibia force, right leg | 4.9 kN | 0.4 kN | 4.5 kN | 0.3 kN |
| femur torque, left leg | 240 Nm | 280 Nm | 170 Nm | 280 Nm |
| femur torque, right leg | 240 Nm | 280 Nm | 160 Nm | 280 Nm |
| tibia torque, left leg | 65 Nm | 57 Nm | 66 Nm | 54 Nm |
| tibia torque, right leg | 65 Nm | 57 Nm | 67 Nm | 55 Nm |

Figure 18:
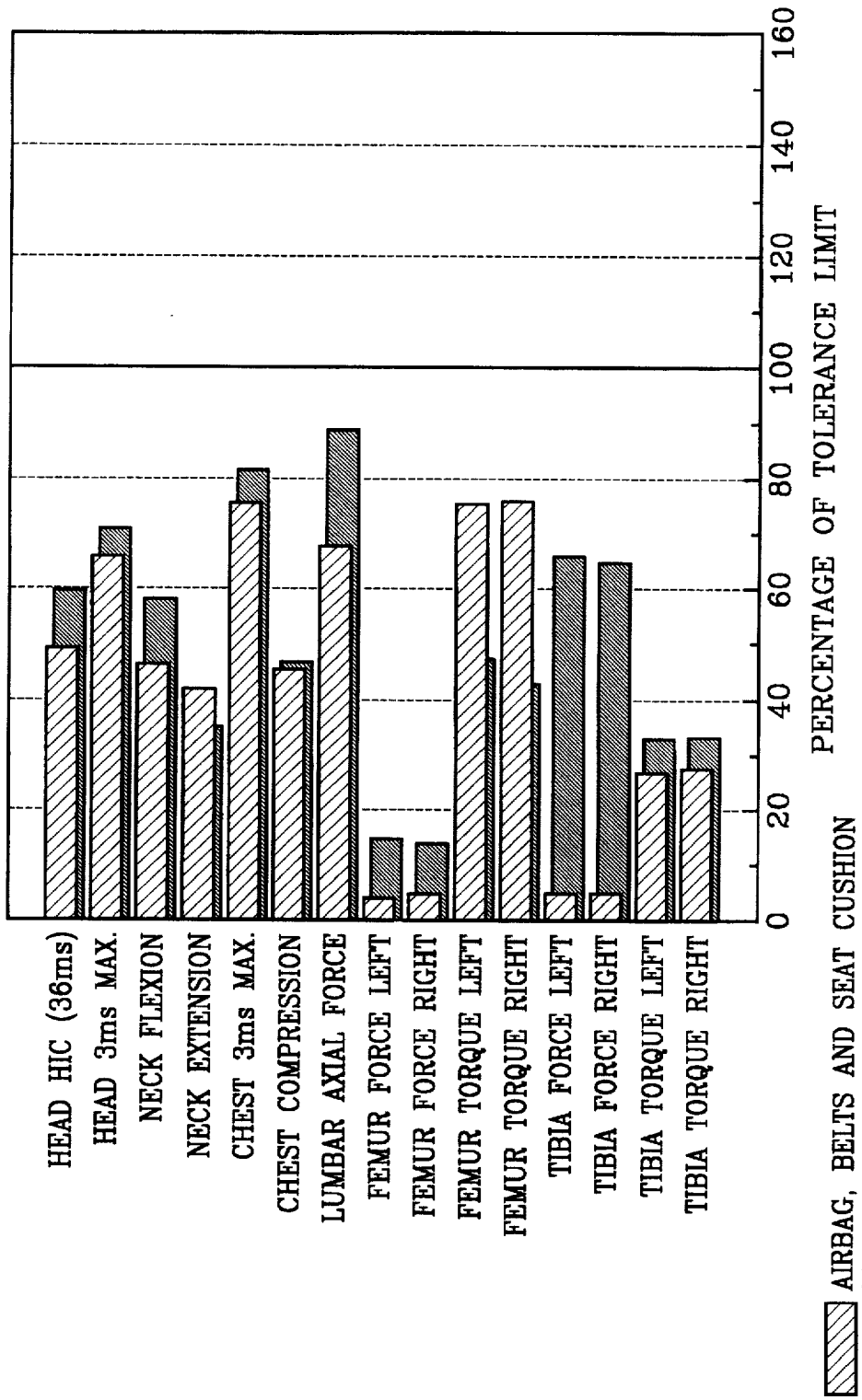
FIG. 18 is a chart showing injury measures, based upon a computer simulation using MADYMO, for a vehicle occupant who is restrained by a seat belt, airbag and knee bolster versus a vehicle occupant restrained by a seat belt, airbag and a seat cushion restraint system.

Referring next to FIG. 18 there is shown a graphic comparison of the injury measures of the baseline model and the model with the seat cushion restraint system, both with a seat belt being worn by the vehicle occupant. With the use of seat belts, the axial force on the femurs is of course low, but the axial force on the tibias remains at approximately the same 5 kN level obtained in the unbelted baseline case. Again, the seat cushion restraint system dramatically reduces these forces by lifting the vehicle occupant's feet off the toeboard before high bracing forces can occur. In addition, the reaction force of the lower torso against the seat cushion restraint system causes a reduction of the lap belt force of 25%. This reduces the risk of seat belt injuries in the abdominal region of the vehicle occupant.

Both with and without seat belt, the axial force in the lumbar spine was reduced with the use of the seat cushion restraint system. On first encounter this seems contradictory to expectation. However, without the seat cushion restraint system, both the knee bolster and seat belt cause the lower torso to push deeper into the seat cushion. This causes the buttocks to bottom out against the anti-submarining seat pan, resulting in a significant upward force into the lumbar spine.

The simulations show that a rise height of 100 mm is sufficient to lift the feet of a vehicle occupant off the floor and keep them away from the toeboard during the entire deceleration phase of the vehicle. Although the lifting needs to be performed in a timely fashion, the simulations indicate that reaching the full lift height at 60 ms into the crash is sufficient to effectively restrain the lower torso. The relatively long (45 ms) rising time makes application of an airbag device to lift the seat cushion most favorable. The pressure required for such an airbag to lift the seat cushion restraint system is in the range of 150 to 200 kPa. With a required airbag volume of less than 10 liters, this falls well within the capability of airbag components currently in use.

The optimized seat cushion restraint system rise height and time for the unbelted configuration also showed good results for the belted configuration without repositioning the lap belt anchor points.

Restraint devices can only operate effectively if they are used as designed. The seat cushion restraint system works best if the occupant assumes a relaxed posture. However, typical human behavior prior to a crash is to brace for impact against the toeboard. Preliminary simulations with pre-bracing have shown the seat cushion restraint system to be quite effective in forcing the legs to bend at the knees. Although the injury measures for the lower extremities are increased over the relaxed case, the seat cushion restraint system still manages to significantly reduce the forces and moments compared to the configuration without seat cushion restraint system.

A child dummy model (3-year old P3 dummy) study was also conducted. The simulation was configured for an unbelted, out-of-position child sitting on the tip of the seat. The simulation results showed no increase of injury measures due to the seat cushion restraint system being activated.

The simulation study demonstrated the potential for significant reduction of lower limb injury measures through the use of the seat cushion restraint system disclosed herein. Simulations show a dramatic reduction of tibia and femur axial forces for unbelted occupants as well as an equally strong reduction of tibia axial forces and significant reduction of the lap belt forces for belted occupants. These reductions are achieved without affecting the injury measures for head and chest.

The simulations indicate that raising the front 150 mm of the seat cushion by 100 mm, with a rise time of 45 ms (after airbag trigger), will suffice to keep the feet away from the toeboard during the deceleration phase of the vehicle, and to sufficiently retard the lower torso without needing a full knee bolster. Existing airbag technology can be applied to achieve this rise height in a timely fashion.

Although this study focussed on the passenger side of the vehicle, many of its findings will also apply to the driver side.

While certain representative embodiments and details have been presented for the purpose of illustrating the invention, it will be apparent to those skilled in the art that various changes and modifications may be made therein without departing from the spirit and scope of the invention.

We claim:

1. A seat cushion restraint system comprising a vehicle seat for the driver of a vehicle located behind a steering wheel and having a seat cushion and a backrest, an airbag for elevating only the front part of the seat cushion, and a means of sensing a crash of a vehicle, the seat cushion extending substantially horizontally, the means of sensing a crash communicating with the airbag, the airbag being activated when the means of sensing a crash senses a crash of a selected severity thereby elevating only the front part of the seat cushion while a rear part of the seat cushion continues to extend substantially horizontally and is not elevated or lowered and the airbag when inflated has a central portion bordered by a pair of lateral marginal portions, the central portion of the airbag having a greater height than the lateral marginal portions such that a portion of the front part of the seat cushion is elevated to a height which is greater than the rest of the front part of the seat cushion such that the inflating airbag forces the driver's legs apart to decrease the interaction between the driver's legs and the steering wheel.

2. The seat cushion restraint system of claim 1 wherein the airbag elevates only the front part of the seat cushion a distance of at least about 100 mm when activated.

3. The seat cushion restraint system of claim 2 wherein the front part of the seat cushion extends for a distance of about 100 to 200 mm from the front of the seat cushion towards the backrest.

4. The seat cushion restraint system of claim 1 wherein the front part of the seat cushion extends for a distance of about 100 to 200 mm from the front of the seat cushion towards the backrest.

5. A seat cushion restraint system comprising a front bench seat for a motor vehicle located behind a steering wheel and having a seat cushion and a backrest, an airbag for elevating only the front part of the seat cushion, and a means of sensing a crash of a vehicle, the seat cushion extending substantially horizontally, the means of sensing a crash communicating with the airbag, the airbag being activated when the means of sensing a crash senses a crash of a selected severity thereby elevating only the front part of the seat cushion while a rear part of the seat cushion continues to extend substantially horizontally and is not elevated or lowered, and the airbag when inflated has a first portion aligned with the steering wheel and bordered by a pair of lateral marginal portions, the first portion of the airbag when inflated having a greater height than the lateral marginal portions of the airbag such that a first portion of the front part of the seat cushion is elevated to a height which is greater than the rest of the front part of the seat cushion and the inflating airbag forces the driver's legs apart to decrease the interaction between the driver's legs and the steering wheel.

6. The seat cushion restraint system of claim 5 wherein the airbag elevates only the front part of the seat cushion a distance of at least about 100 mm when activated.

7. The seat cushion restraint system of claim 6 wherein the front part of the seat cushion extends for a distance of about 100 to 200 mm from the front of the seat cushion towards the backrest.

8. The seat cushion restraint system of claim 5 wherein the front part of the seat cushion extends for a distance of about 100 to 200 mm from the front of the seat cushion towards the backrest.

9. A seat cushion restraint system comprising a vehicle seat for the driver of a vehicle located behind a steering wheel and having a seat cushion and a backrest, the seat cushion extending substantially horizontally, an airbag system comprising an inflator and an inflatable bag being located in the region of the front part of the seat cushion, and a crash sensor, the crash sensor communicating with the inflator and activating the inflator when the crash sensor senses a crash of a selected severity, the activated inflator inflates the airbag thereby elevating only the front part of the seat cushion while a rear part of the seat cushion continues to extend substantially horizontally and is not elevated or lowered and the airbag when inflated has a central portion aligned with the steering wheel and bordered by a pair of lateral marginal portions, the central portion of the inflated airbag having a greater height than the lateral marginal portions such that the inflating airbag forces the driver's legs apart to decrease the interaction between the driver's legs and the steering wheel.

10. The seat cushion restraint system of claim 9 wherein the airbag elevates only the front part of the seat cushion a distance of at least about 100 mm when activated.

11. The seat cushion restraint system of claim 9 wherein the front part of the seat cushion extends for a distance of about 100 to 200 mm from the front of the seat cushion towards the backrest and the airbag elevates only the front part of the seat cushion a distance of at least about 100 mm when activated.

12. A seat cushion restraint system comprising a front bench seat for a motor vehicle located behind a steering wheel and having a seat cushion and a backrest, the seat cushion extending substantially horizontally, an airbag system comprising an inflator and an inflatable bag being located in the region of the front part of the seat cushion, and a crash sensor, the crash sensor communicating with the inflator and activating the inflator when the crash sensor senses a crash of a selected severity, the activated inflator inflates the airbag thereby elevating only the front part of the seat cushion while a rear part of the seat cushion continues to extend substantially horizontally and is not elevated or lowered and the airbag when inflated has a first portion aligned with the steering wheel and bordered by a pair of lateral marginal portions, the first portion of the airbag when inflated having a greater height than the lateral marginal portions of the airbag such that a first portion of the front part of the seat cushion is elevated to a height which is greater than the rest of the front part of the seat cushion and the inflating airbag forces the driver's legs apart to decrease the interaction between the driver's legs and the steering wheel.

13. The seat cushion restraint system of claim 12 wherein the airbag elevates only the front part of the seat cushion a distance of at least about 100 mm when activated.

14. The seat cushion restraint system of claim 12 wherein the front part of the seat cushion extends for a distance of about 100 to 200 mm from the front of the seat cushion towards the backrest and the airbag elevates only the front part of the seat cushion a distance of at least about 100 mm when activated.

15. A seat cushion restraint system comprising a front seat for a motor vehicle and is located behind a steering wheel and having a seat cushion and backrest, the seat cushion extending substantially horizontally, an airbag system comprising an inflator and an inflatable bag being located in the region of the front part of the seat cushion, and a crash sensor, the crash sensor communicating with the inflator and activating the inflator when the crash sensor a crash of a selected severity, the activated inflator inflates the airbag thereby elevating only the front part of the seat cushion while a rear part of the seat cushion continues to extend substantially horizontally and is not elevated or lowered, the front part of the seat cushion having hinged portions which are normally adjacent to one another along a line which is aligned with the steering wheel, and upon inflation the airbag exerts a force causing the hinged portions of the front part of the seat cushion to swing upwardly and outwardly about pivot points located near the lateral edges of the seat cushion which forces the driver's legs apart as it raises them to minimize the interaction between the driver's legs and the steering wheel.

16. The seat cushion restraint system of claim 15 wherein the airbag elevates only the front part of the seat cushion a distance of at least about 100 mm when activated.

17. The seat cushion restraint system of claim 15 wherein the front part of the seat cushion extends for a distance of about 100 to 200 mm from the front of the seat cushion towards the backrest and the airbag elevates only the front part of the seat cushion a distance of at least about 100 mm when activated.

* * * * *